Feb. 9, 1960 R. M. MAGNUSON 2,924,259
FRUIT PITTING METHOD
Filed April 15, 1957 4 Sheets-Sheet 1
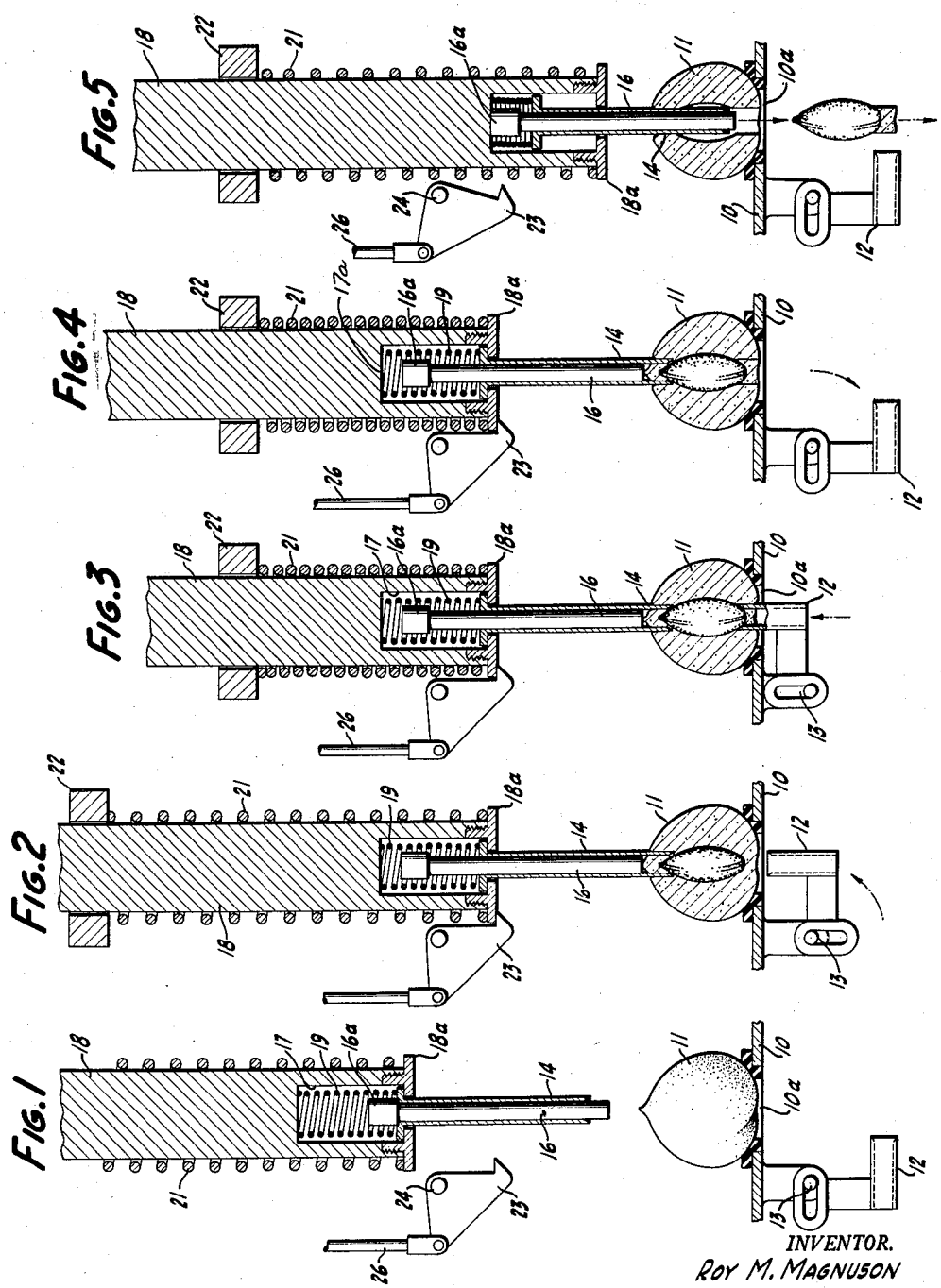
INVENTOR.
Roy M. Magnuson
BY
*Harper Allen*
ATTORNEY

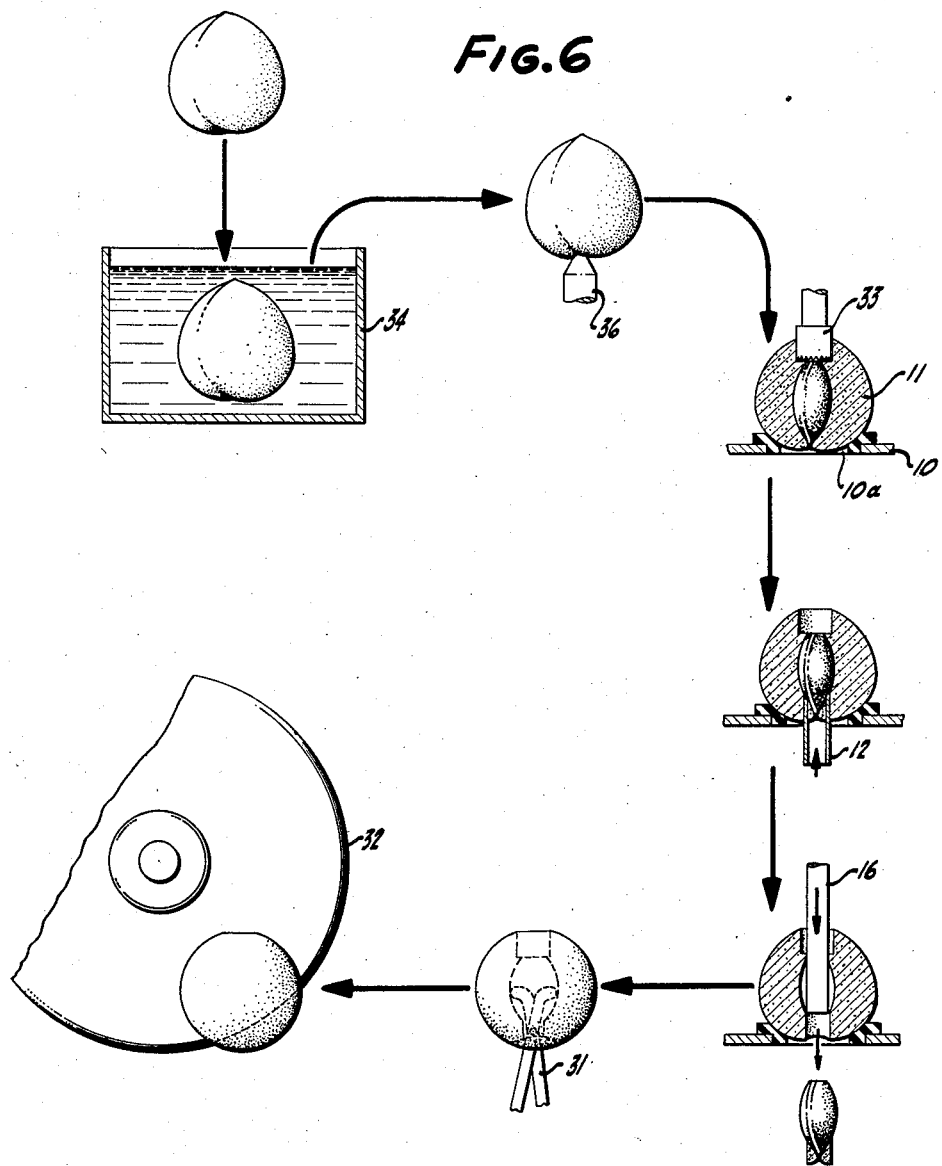

Feb. 9, 1960 — R. M. MAGNUSON — 2,924,259
FRUIT PITTING METHOD
Filed April 15, 1957 — 4 Sheets-Sheet 3
FIG_7
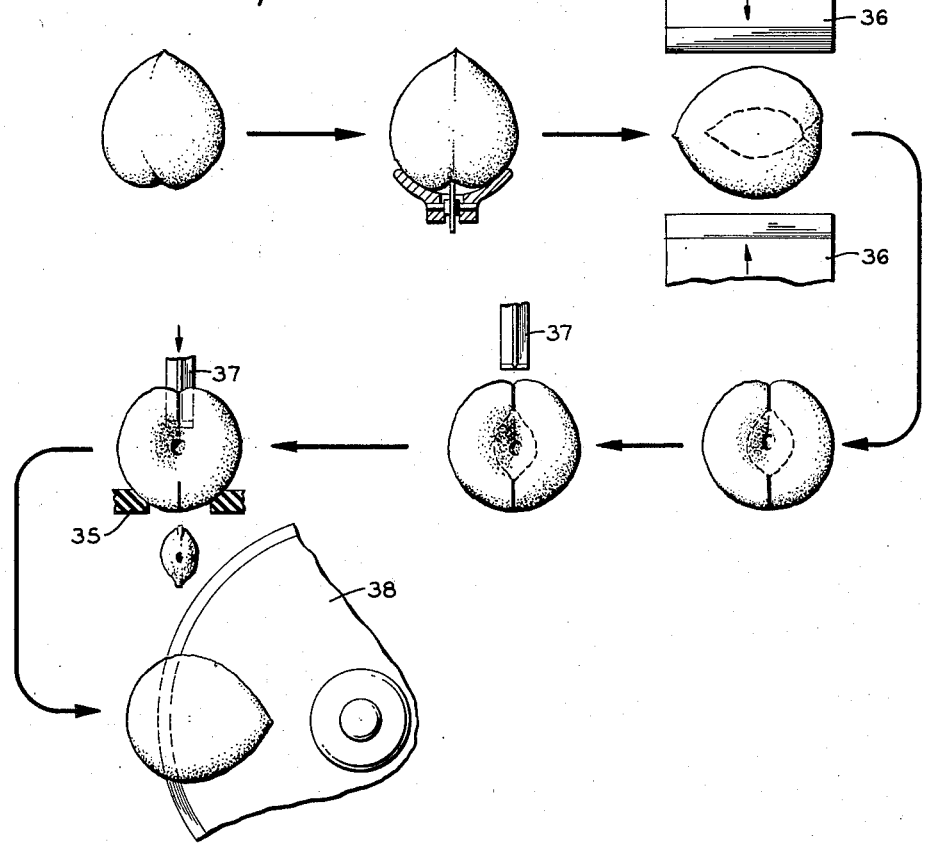
FIG_8
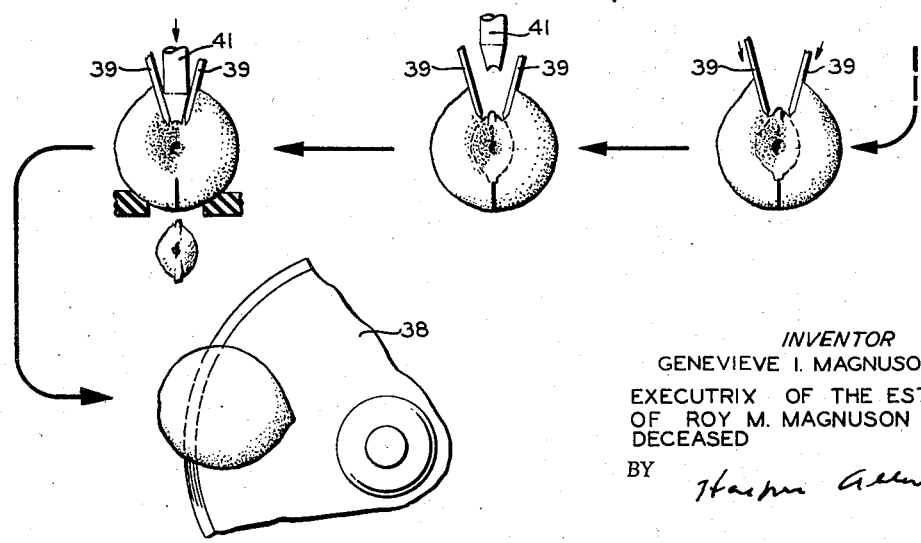
INVENTOR
GENEVIEVE I. MAGNUSON
EXECUTRIX OF THE ESTATE
OF ROY M. MAGNUSON
DECEASED
BY
ATTORNEY Feb. 9, 1960
R. M. MAGNUSON
2,924,259
FRUIT PITTING METHOD
Filed April 15, 1957
4 Sheets-Sheet 4
FIG_9
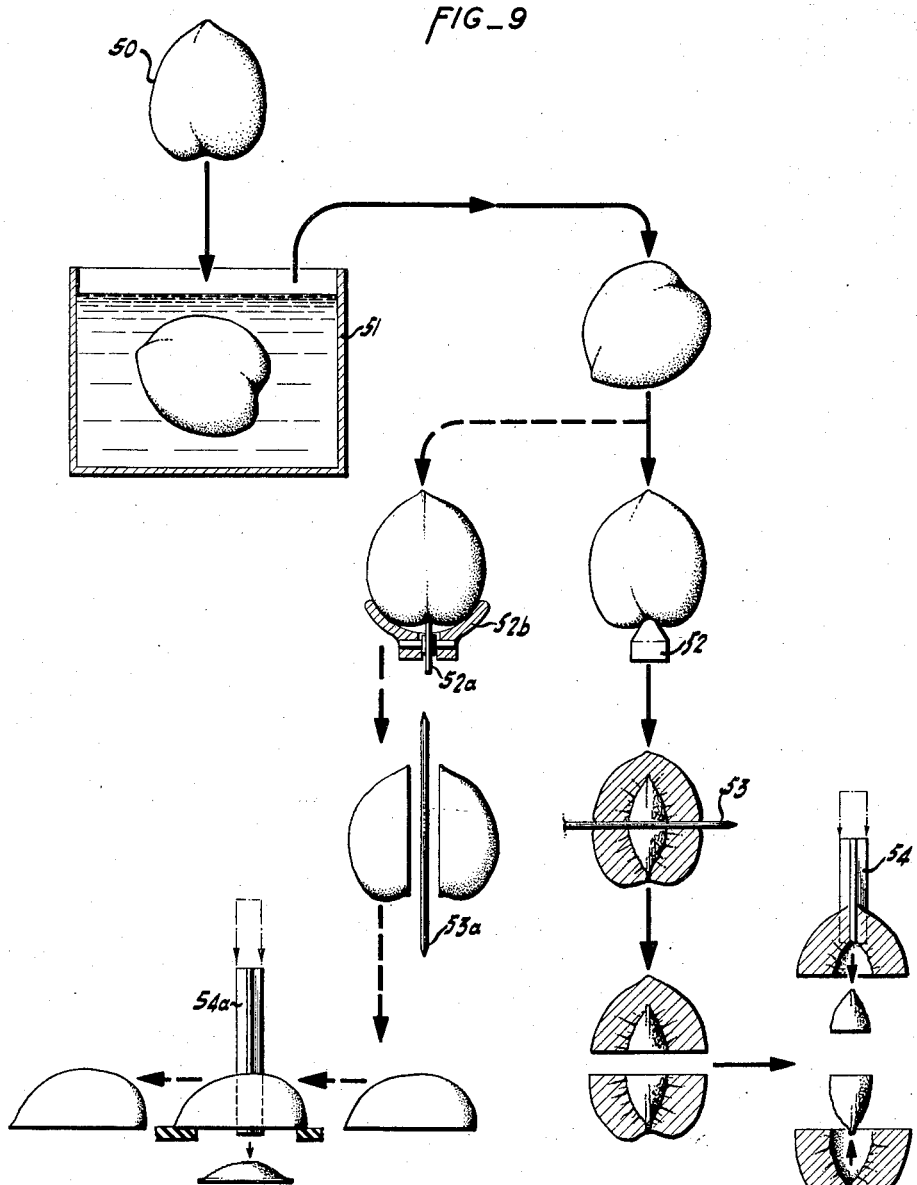
INVENTOR
GENEVIEVE I. MAGNUSON
EXECUTRIX OF THE ESTATE
OF ROY M. MAGNUSON
DECEASED
BY
ATTORNEY United States Patent Office 2,924,259
Patented Feb. 9, 1960

2,924,259

FRUIT PITTING METHOD

Roy M. Magnuson, deceased, late of Saratoga, Calif., by Genevieve I. Magnuson, Saratoga, Calif., executrix Application April 15, 1957, Serial No. 653,509

16 Claims. (Cl. 146—238)

This application is a continuation in part of my copending application, Serial No. 425,587, filed April 26, 1954, now abandoned, which was a continuation-in-part of my abandoned application, Serial No. 51,335, filed September 27, 1948.

The present invention relates to the processing of drupaceous fruits such as peaches, and is concerned more particularly with a new process for preparing the peaches for canning operations by effecting pitting of the peaches in a novel and advantageous manner.

Known pitting machines for peaches operate on the principle of cutting the pit out of the fruit, and because of the non-spherical shape of the pit this has required orientation of the peach with respect to both the stem-blossom axis and with respect to major cross-sectional plane of the pit which also passes through the suture of the peach. Orienting a peach with reference to its stem-blossom axis is a relatively easy process and can be effected manually with ease or by simple automatic apparatus. However, the second step of orientation is more difficult, and requires automatic apparatus.

Also the present process of preparing peaches for canning involves a disadvantageous sequence of operations because of certain inherent characteristics of the peach. In general the peach is first halved and pitted and thereafter peeled in preparation for canning and the usual method of chemical peeling employs lye. In peaches the stone is surrounded by a red meat portion and this red meat portion reacts with lye so that it is turned ugly brown. As a result of this characteristic of peaches, in the pitting of peaces it has been necessary to make a cut spaced from the pit itself to remove this red meat portion from the inside of the peach half so that subsequent lye peeling operations will not produce an unattractive fruit. As a result, many pounds of peach meat are lost each year according to present production methods of processing peaches for canning.

In accordance with the instant invention, the present process contemplates a new pitting method which in one form avoids the necessity of orienting the peach with reference to the major plane of the peach pit and also avoids in some cases the orienting of the peach with reference to its stem-blossom axis. Also, as a result, the sequence of steps in processing the peaches may be varied from known processes in an advantageous manner to provide a maximum yield in peaches during the canning operation and to provide a more attractive processed peach in the can.

The present peach pitting method also enables the handling of the fruit in a riper condition and the handling of freestone peaches, as well as clings. This has not been practical in most types of peach pitting apparatus where the peach must be grasped firmly and the presence of any soft flesh interferes with the pitting operation and results in bruising of the peaches.

In addition, the present pitting method lends itself to economical canning of whole pitted peaches, and also to convenient slicing operation as the two holes in the ends of the peach are in alignment with the stem-blossom axis and can be employed in orienting and feeding the fruit to the slicing apparatus.

Where peach halves are desired, the whole pitted peach can be oriented with reference to the suture by internal sensing of the pit cavity, whose greatest diameter will lie in the plane containing the suture.

Accordingly, it is a general object of the present invention to provide a new peach processing method for preparing peaches for canning and to provide a greater yield per ton of peaches in the canning operation.

It is another general object of the present invention to provide a new peach processing method for preparing drupaceous fruit for canning or drying.

It is another general object of the invention to provide a new peach pitting method which enables the pitting of both cling and freestone peaches in riper condition than can be handled in present types of pitting equipment or with present pitting processes.

A further object of the invention is to provide a new peach processing method and new peach pitting method which will result in a more attractive product in the can by saving the red meat portion immediately adjacent the pit.

Still another object of the invention is to provide an improved peach processing and pitting method which adapts itself to the handling of peach halves in a new and advantageous manner.

A further object of the invention is to provide an impact pitting process where the peach is peeled prior to the orienting and pitting operations.

Other objects and advantages of the invention will be apparent from the following description of a preferred embodiment thereof as illustrated in the accompanying drawings, in which:

Figure 1 is a schematic view of apparatus illustrating the peach pitting process, showing the peach in oriented position with reference to the pitting member.

Figure 2 is a view similar to Figure 1, showing a subsequent stage of the process wherein a cut has been made at the blossom end of the fruit.

Figure 3 is another view similar to Figures 1 and 2, showing the operation of making a cut in the stem end of the fruit.

Figure 4 is a view similar to Figures 1 through 3, showing the position of the parts where the impacting member is under tension but is still latched and restrained from movement.

Figure 5 is a view similar to Figures 1 through 4, in which the restraint on the impacting member has been released, and the pit has been impacted and removed from the fruit.

Figure 6 is a diagram of the peach processing operation utilizing a modified step in the process.

Figure 7 is a diagram of a peach processing operation wherein the opposed cuts made in the fruit with respect to the pit are placed on opposite sides of the pit rather than at the opposite ends.

Figure 8 represents a modified step in the processing operation shown in Figure 7.

Figure 9 illustrates a peach processing operation for producing peeled, pitted half fruits.

In the general method of the invention the peaches are first peeled and preferably this is performed by the conventional lye peeling process employed in practically all commercial canning operations. A lye peeling tank 34 is indicated in Figure 6. After the peach is peeled, it is next oriented with respect to its stem-blossom axis, when such orientation is desired, and this orienting step may be done manually or with a rotation or reciprocating type of peach orienter 36 which operates to shift the peach in a cup until its blossom cavity is lowermost. This type of orientation is shown in the patents to Carroll 2,220,511 and 2,232,208.

After orientation the peach is supported in oriented position, preferably on a flexible or resilient annular support 10 contacting the stem end adjacent its periphery, with the aperture 10a in the support of sufficient size to pass the pit or stone. The aperture may be smaller than the pit so that it will deform or expand to pass the pit.

After the peach is supported in oriented position, a cut is made in the flesh of the peach to the pit at one end, for example, the stem end, and this cut is preferably in the direction of the stem blossom axis. It may take the form of a straight incision by a knife or it may be an annular cut by a tubular knife 12. In either case the cut provides an opening through the flesh of the peach at the stem end for subsequent ejection of the pit therethrough. While the cut in the peach may be omitted, it is advantageous in providing for easier pitting and a better appearance of the pitted peach.

With the peach supported at its cut end and in oriented position, a cut is made in the upper or blossom end of the peach for entrance of the peach pitting knife or member, which may take the form of a plain rod or a cross-shaped knife. In the case of a rod-like pitting member of a tubular knife brought down through the flesh of the peach until it engages the adjacent end of the pit, and the rod rests against the flesh. The flesh within the tubular knife will serve to cushion slightly the impact of the pitting member against the pit. In the case of a knife-like member, the member itself cuts through the flesh. Thereafter the pitting member is impacted or driven sharply to impact the pit in line with the stem-blossom axis and to transfer its force to the pit, and this impact is performed so fast and so sharply that an inertia effect results and the pit is ejected from the peach by virtue of its own velocity through the cut portion of the flesh and is cleanly separated from the flesh of the fruit. With a sharp, fast impact effect in the thrust imparted to the pit, there is no bruising of the peach on its annular support and substantially no flesh is carried away with the pit. Where an annular cut is provided, a cylindrical portion of the flesh from the blossom end of the peach is attached to and is expelled with the pit.

In accordance with an alternative preferred form of the invention, the cut at the stem end of the fruit is performed with a routing member 33 (Figure 6) such as a conventional end mill for example, which is brought down through the flesh of the fruit against the pit and routs or machines a flat end surface on the pit. This machining operation also comminutes and removes the sharp fin which projects outwardly from the pit at the blossom end of the fruit. Thereafter the routing member can be used as the impact member, or if desired a separate pitting member 16 can be engaged with the cut surface of the pit and then impacted or driven sharply to transfer its force to the pit, and provide a self-ejecting action of the pit from the peach through the cut portion of the flesh at the stem end by virtue of the pit velocity.

Referring to the drawings, there is illustrated schematically suitable apparatus for carrying out the above described method. There is shown in Figure 1 a peach support 10 on which a peach 11 is resting and the upper end of the support may be formed of suitable flexible or resilient material such as rubber which is shaped to conform generally to the stem end of the peach and which is provided with a central aperture 10a of sufficient diameter to pass the pit of the peach. Associated with the bottom support 10 is a tubular cutting knife 12 having a slotted pivotal mounting at 13 so that it can be swung up into line with the stem-blossom axis of the peach and effect a tubular cut or incision into the peach as illustrated in Figure 3.

Associated with the support 10 and in axial alignment therewith there is an upper tubular cutting knife 14 within which a rod-like pit ejecting member 16 is suitably housed with its upper and large end 16a disposed within an opening 17 of an impact member or hammer 18. The member 18 may be tubular in general shape and is suitably supported for vertical movement along its axis both as to its adjusted position and for effecting an impact blow at the desired time. A spring 19 is mounted within the opening 17 and engages the flanged upper end of the tubular cutting knife 14 to maintain it in position. A large spring 21 is disposed about the impact member 18 to engage with the flange 18a at the lower end thereof and at the other end with an adjustable collar 22 which can be moved along the impact member 18 by suitable means. Associated with the impact member 18 is a latch lever 23 which is pivotally mounted at 24 and has a release control rod 26 pivotally connected thereto. This latch lever 23 also forms a stop for the preliminary downward movement of the impact member 18, as illustrated in Figure 2, when the tubular cutting knife has entered the peach and the rod 16 is resting against the flesh of the peach. In Figure 3 the lower tubular knife 12 has been moved into position to make the lower incision or cut in the flesh of the fruit and the collar 22 has been brought down to compress the spring 21 and store the necessary energy therein for the impact pitting blow of the pitting member or rod 16.

In Figure 4 the lower knife 12 has been removed and the parts are positioned ready for tripping of the impact blow and pitting of the peach, and the result of this operation is shown in Figure 5, the latch 23 having been released so that the spring 21 expands substantially instantaneously. After it has expanded for the travel necessary to take up the lost motion between the upper end of the rod 16 and the hammer face 17a of the impact member 18 at the upper end of the aperture 17, the impact rod 16 is given a quick sharp blow and is travelling at a sufficiently rapid rate when it enters the peach, contacts the end of the pit and travels with the pit for only a short distance, sufficient to transfer its kinetic energy to the pit. The movement of the rod is then interrupted and the pit expels itself bodily from the peach and is torn free from the surrounding flesh. It is extremely important that the speed of the pitting member at the time it impacts the pit be at a sufficient rate that the pit is ejected cleanly from within the fruit and that no bruising of the fruit against its annular support occurs. In practice, I have found that for peaches the spring 21 should impart a velocity to the pitting member of not less than 38 to 40 feet per second, and preferably the velocity should be higher. It will be appreciated that this velocity will vary with other drupaceous fruits for an efficient and effective pitting operation. The speed range of the impact rod or pitting member is considered to be a minimum for peach pitting, but higher speeds may be desirable depending upon the type of the fruit and its ripeness. The velocity should not be high enough to cause pit shattering. For example, higher speed ranges are desirable for clingstone fruits as compared with freestone fruits.

It will be noted that because this pitting method is not dependent upon grasping the peach, the firmness of the peach flesh is not important and that peaches can be processed in a more ripened condition than is possible with conventional methods where the peach must be grasped or pushed against in performing the pitting operation. It will be noted further that the method is easily applicable to both cling and freestone peaches, as well as other drupaceous fruits.

Also, with this method of pitting the possibility is offered of processing whole pitted peaches which has not been possible with prior processing and pitting methods.

Where it is desired to pack peach halves and to make the halving cut in the plane containing suture, the whole pitted peach is oriented with respect to the suture by sensing the pit cavity whose greatest cross sectional area or greatest diameter will be in a plane coinciding with the suture. Irrespective of the difficulty in locating the suture of the peach, the pit cavity is always of sufficiently greater dimension in one direction than another that the sensing of this pit cavity, for example, by means of an internal sensing finger or scissors 31 (Figure 6), can easily be done and the peach accurately oriented for the halving operation using a knife 32.

It will be apparent also that the impact principle can be applied to loosen the pit within the fruit without ejecting the pit or disturbing the flesh. In packing spiced fruit this operation replaces the conventional partial cut around the pit performed for penetration of the spice.

In certain cases the above described process as disclosed in Figures 1 through 5 may be preceded with a peeling operation as disclosed in Figures 6 and 9.

Referring particularly to Figure 7, a modified form of the impact pitting process is shown wherein the peach is oriented not only with reference to its stem-blossom axis, but also with reference to its suture line in order to properly position the peach for the pitting operation. In this processing operation the peach may also be lye peeled before the other processing as indicated in Figure 6.

As shown in Figure 7, the peach either peeled or unpeeled is oriented in the manner disclosed in the above mentioned Carroll patents, for example, and then in oriented position is transferred and held in oriented position by suitable means between two opposed knives 36, which are disposed parallel to the plane containing the suture line of the peach and the line of division between the pit halves, and these knives 36 are utilized to make cuts or incisions in the opposite sides of the flesh of the peach penetrating to engage the pit. The cuts lie in a plane passing through the stem-blossom axis. The peach is then transferred while maintaining its oriented position into alignment with an impact pitting knife 37 of cross-shaped construction on a support 35. The knife 37 is operated in the manner described in connection with the impact pitting rod 16 to impact the pit and eject it through the lower cut in the fruit. Subsequently the peach is transferred in oriented position and engaged with a halving knife 38 to sever the remaining flesh of the fruit so that two perfect peach halves result with the red meat left in the interior.

Referring to Figure 8, a modified step in the process of impact pitting is disclosed in connection with the process in Figure 7. In Figure 8 a flesh separating step of the peach halves is effected by introducing two separating blades 39 into the upper cut or incision in the fruit and rotating these blades to deform the flesh of the peach halves away from the pit and provide an opening for entry of the impacting rod 41, thereby avoiding the two small slits produced in the peach halves by the cross-shaped impact knife 37. Also, the separating blades 39 place the meat attached to the pit under preliminary tension and thereby increase the efficiency of the impact pitting operation.

The first step of the process illustrated in Figure 9 comprises the peeling of whole fruit, preferably by chemical means such as the conventional lye peeling process employed in connection with peeling peaches. This peeling step is illustrated schematically in Figure 9 by illustrating the feeding of a peach 50 to lye bath 51.

From the lye bath 51 the peeled whole peach is transferred in un-oriented condition to an orienting means indicated schematically at 52 which serves to orient the peach to place it in a predetermined position, i.e., with reference to its stem-blossom axis. Preferably the pretreatment of the peach before orientation, for example by peeling the whole peach, provides a uniform smooth condition of the surface of the peach which promotes a reliable orienting action. In orientors employing some means to rotate the peach within a cup such as shown at 52b, utilizing the rotating wheel indicated at 52a in the drawing, a nonuniform condition of the surface of the fruit will interfere with and sometimes prevent alignment thereof within the time interval provided for orienting in an automatic processing line. Where the character of surface of the fruit is made uniform as disclosed herein by removing the peel, the orienting means produces orientation of a large percentage of the fruit in a shorter time interval. Suitable orienting means of this character are shown in the patents to Goransen No. 1,742,653 and Carroll No. 2,220,511.

From the orienting means the oriented fruit in an oriented position is presented to suitable halving means, for example, a saw 53 which is disposed to perform a cross-cut halving operation. In other words the fruit is cut in half midway of its length and perpendicular to the stem-blossom axis producing cross-cut fruit halves with half pits therein.

These fruit halves are then transferred to a pitting stage, while maintaining their oriented position with respect to the cut surface and the half pits are then removed from the half fruit. For example this may be done in a preferred manner by impacting each half pit at its small or uncut end by a cross-shaped knife or impact member 54, and thereby expelling the half-pit from the half fruit.

Subsequent to the above steps the pitted halved fruit may be subjected to any conventional canning or packing process.

In carrying out the method it will be noted that a new type of commercial product is provided, i.e., cross-cut peach halves which have still intact the red meat portion adjacent the pit, and where the only waste is the thin slice cut by the saw in halving the peach. This process therefore would provide a greater yield per ton over conventional processes. Further, with particular reference to peaches and apricots, by omitting the requirement for location of the suture, the process can be substantially less in cost than other packing methods where such orientation is required. Also it will be noted that with this process the split pit peaches may be handled equally well as peaches with perfect pits.

In another preferred form of the invention, the peeled peach, as indicated by the dotted flow lines is transferred in unoriented condition to an orienting means indicated schematically at 52a which serves to orient the peach, to place it in a predetermined position, i.e. with reference to both its stem-blossom axis and to the plane containing its suture line. Suitable orienting means of this character are shown in the above mentioned patent to Carroll.

From the orienting means 52a the oriented fruit in an oriented position is presented to suitable halving means, for example a saw 53a which is positioned to halve the fruit in a plane containing the suture line, and to produce conventionally shaped fruit halves.

These half fruits are then transferred to a single file relation and subjected to an impact pitting operation by a cross shaped knife 54a which engages the pit on the side opposite to the cut surface and works in a plane substantially perpendicular to the plane of the cut surface. The impact pitting is done in the manner disclosed in Figures 1 through 5 and is effected to instantaneously eject a half pit free from clinging meat and to leave the entire flesh of the fruit in the peach half.

With this alternative preferred method of producing fruit halves, split pit peaches can also be handled successfully.

While the method and apparatus of the instant invention have been described in connection with the pitting of peaches, it is apparent that this method can also be applied to other drupaceous fruits and that the method and the apparatus can be embodied in other forms than those disclosed herein so that the scope of the invention should be limited only to the scope of the claims appended hereto.

What is claimed is:

1. The method of pitting drupaceous fruits which comprises first orienting the fruit with reference to its stem-blossom axis, supporting the fruit at one end about its stem-blossom axis, effecting a cut in the fruit at both ends in alignment with the stem-blossom axis, and then ejecting the pit through the supported end and through the opening cut into the fruit by an impact effect applied to the pit, the impacting force being so great as to eject the pit through a small opening in the fruit without substantially tearing the fruit, and the inertia of the fruit being so related to the impacting force as substantially to counteract the tendency of movement of the pit to move the fruit with it.

2. The method of pitting drupaceous fruits which comprises first orienting the fruit with reference to its stem-blossom axis, supporting the fruit at one end about its stem-blossom axis, effecting a tubular cut in the fruit at both ends in alignment with the stem-blossom axis, and then ejecting the pit through the supported end and through the opening cut into the fruit by an impact effect applied to the pit, the impacting force being so great as to eject the pit through a small opening in the fruit without substantially tearing the fruit, and the inertia of the fruit being so related to the impacting force as substantially to counteract the tendency of movement of the pit to move the fruit with it.

3. The method of processing drupaceous fruits which comprises first orienting the fruit with reference to its stem-blossom axis, supporting the fruit at one end about its stem-blossom axis, effecting a tubular cut in the fruit at both ends in alignment with the stem-blossom axis, then ejecting the pit thorugh the supported end and through the opening cut into the fruit by an impact effect applied to the pit, the impacting force being so great as to eject the pit through a small opening in the fruit without substantially tearing the fruit, and the inertia of the fruit being so related to the impacting force as substantially to counteract the tendency of movement of the pit to move the fruit with it, aligning the pitted fruit by sensing the tubular holes therein, and slicing the fruit.

4. The method of processing fruit which comprises first orienting the fruit with reference to its stem-blossom axis, supporting the fruit at one end about its stem-blossom axis, effecting a tubular cut in the fruit at both ends in alignment with the stem-blossom axis, then ejecting the pit through the supported end and through the opening cut into the fruit by an impact effect applied to the pit, the impacting force being so great as to eject the pit through a small opening in the fruit without substantially tearing the fruit, and the inertia of the fruit being so related to the impacting force as substantially to counteract the tendency of movement of the pit to move the fruit with it, aligning the pitted fruit by sensing the tubular holes therein, sensing the pit cavity to orient the fruit with reference to the diametral plane containing the suture, and halving the fruit through the suture.

5. The method of processing peaches which comprises first orienting the peach with reference to its stem-blossom axis, supporting the peach at one end about its stem-blossom axis, effecting a cut in the peach at both ends in alignment with the stem-blossom axis, then ejecting the pit through the supported end and through the opening cut into the peach by an impact effect applied to the pit, the impact being delivered at a velocity of not less than about 38 feet per second, aligning the pitted peach by sensing the holes therein, sensing the pit cavity to orient the peach with reference to the diametral plane containing the suture, halving the peach through the suture, and trimming the pit cavity of each half.

6. A method of processing clingstone peaches which comprises orienting a peach with reference to its stem-blossom axis, machining the blossom end of the peach to provide a flat end surface on the pit substantially perpendicular to said axis, engaging the machined pit surface, and pitting the fruit by impacting the pit along the stem-blossom axis to eject the pit from the fruit, the impacting force being so great as to eject the pit through a small opening in the fruit without substantially tearing the fruit, and the inertia of the fruit being so related to the impacting force as to substantially counteract the tendency of movement of the pit to move the fruit with it.

7. A method of processing clingstone peaches which comprises orienting a peach with reference to its stem-blossom axis, machining the blossom end of the peach to comminute the sharp fin of the pit, engaging the machined pit surface, and pitting the fruit by impacting the pit along the stem-blossom axis to eject the pit from the fruit, the impacting force being so great as to eject the pit through a small opening in the fruit without substantially tearing the fruit, and the inertia of the fruit being so related to the impacting force as to substantially counteract the tendency of movement of the pit to move the fruit with it.

8. The method of processing clingstone peaches which comprises oriening a peach with reference to its stem-blossom axis, machining the blossom end of the peach to provide a flat end surface on the pit, engaging the machined pit surface, pitting the fruit by impacting the pit along the stem-blossom axis from said machined end to eject the pit from the fruit, the impacting force being so great as to eject the pit through a small opening in the fruit without substantially tearing the fruit, and the inertia of the fruit being so related to the impacting force as to substantially counteract the tendency of movement of the pit to move the fruit with it, sensing the pit cavity in the whole fruit to locate the widest portion thereof, orienting the pitted fruit with reference to the diametrical plane containing its suture, and halving the fruit along the suture.

9. The method of processing clingstone peaches which comprises orienting a peach with reference to its stem-blossom axis, machining the blossom end of the peach to provide a flat end surface on the pit, engaging the machined pit surface, pitting the fruit by impacting the pit along the stem-blossom axis from said machined end to eject the pit from the fruit, the impacting force being so great as to eject the pit through a small opening in the fruit without substantially tearing the fruit, and the inertia of the fruit being so related to the impacting force as to substantially counteract the tendency of movement of the pit to move the fruit with it.

10. The process of pitting clingstone peaches which comprises orienting the peach with reference to its stem-blossom axis, making a cut in the stem end of the fruit in a direction parallel to the stem-blossom axis, supporting the fruit at said stem end, routing the fruit at the blossom end thereof to machine a flat end surface on the pit, and impacting the pit at the routed end surface in a line parallel to the stem-blossom axis to eject the pit through the cut at the stem end, the impacting force being so great as to eject the pit through a small opening in the fruit without substantially tearing the fruit, and the inertia of the peach being so related to the impacting force as to substantially counteract the tendency of the movement of the pit to move the fruit with it.

11. The process of pitting clingstone peaches which comprises orienting the peach with reference to its stem-blossom axis, making a cut in the stem end of the fruit in a direction parallel to the stem-blossom axis, supporting the fruit at said stem end, routing the fruit at the blossom end thereof to comminute the sharp fin of the pit, and impacting the pit at the routed end surface in a line parallel to the stem-blossom axis to eject the pit through the cut at the stem end, the impacting force being so great as to eject the pit through a small opening in the fruit without substantially tearing the fruit, and the inertia of the peach being so related to the impacting force as to substantially counteract the tendency of the movement of the pit to move the fruit with it.

12. The method of pitting drupaceous fruits which comprises first orienting the fruit with reference to its stem-blossom axis, cutting the flesh of the fruit in a plane passing through the stem-blossom axis, the cut including cut portions of the flesh on opposite sides of the pit, supporting the fruit in a predetermined position with respect to its stem-blossom axis and with respect to the cut in the fruit and then ejecting the pit through its supported surface and through a cut in the flesh by an impact effect applied to the pit, the impacting force being so great as to eject the pit substantially instantaneously and without substantially tearing the fruit, and the inertia of the fruit being so related to the impacting force as to substantially counteract the tendency of movement of the pit to move the fruit with it.

13. The process of treating drupaceous fruit which comprises first subjecting the whole fruit to a peeling action, then orienting the fruit to a predetermined position thereof with reference to its stem-blossom axis, cutting the flesh of the fruit in a plane passing through the stem-blossom axis, the cut including cut portions of the flesh on the opposite sides of the pit, supporting the fruit in a predetermined position with respect to its stem-blossom axis and with respect to the cut in the fruit, and then ejecting the pit through its supported surface and through a cut in the flesh by an impact effect applied to the pit, the impacting force being so great as to eject the pit substantially instantaneously and without substantially tearing the fruit, and the inertia of the fruit being so related to the impacting force as to substantially counteract the tendency of movement of the pit to move the fruit with it.

14. The method of pitting drupaceous fruits which comprises orienting the fruit with reference to its stem blossom axis, effecting a cut in the flesh of the fruit in a plane passing through the stem-blossom axis, supporting the fruit in a predetermined position with respect to its stem-blossom axis and with repect to the cut in the fruit, separating the flesh at a cut therein to enable application of an impact effect directly to the pit without damaging the flesh, and then ejecting the whole pit through its supported surface and through a cut in the flesh by an impact effect applied to the pit at right angles to the stem-blossom axis, the impacting force being so great as to eject the pit substantially instantaneously and without substantially tearing the fruit, and the inertia of the fruit being so related to the impacting force as to substantially counteract the tendency of movement of the pit to move the fruit with it.

15. A method as recited in claim 14 in which after pitting, the flesh of the fruit is separated into two halves by cutting in a plane containing cuts formerly made.

16. The method of processing fruit which comprises orienting the fruit with reference to its stem-blossom axis, ejecting the pit from the whole fruit, orienting the pitted fruit with reference to its stem-blossom axis, sensing the pit cavity to orient the fruit with reference to the diametral plane containing the suture, and halving the fruit through the suture.

References Cited in the file of this patent

UNITED STATES PATENTS

| | | |
|---|---|---|
| 1,312,332 | Kirino | Aug. 5, 1919 |
| 1,357,004 | Robbins | Oct. 26, 1920 |
| 2,699,191 | De Back et al. | Jan. 11, 1955 |